United States Patent
Tsukamoto et al.

(10) Patent No.: US 9,305,689 B2
(45) Date of Patent: Apr. 5, 2016

(54) INJECTION MOLDING COMPOSITION AND PRODUCING METHOD THEREOF

(75) Inventors: Naoto Tsukamoto, Narita (JP); Mitsuaki Sugiyama, Narita (JP); Takahiro Mori, Narita (JP); Yoshihiko Minachi, Makinohara (JP); Masashi Gotoh, Nikaho (JP); Minao Himeno, Yurihonjo (JP)

(73) Assignee: TDK CORPORATION, Tokyo (JP)

( * ) Notice: Subject to any disclaimer, the term of this patent is extended or adjusted under 35 U.S.C. 154(b) by 189 days.

(21) Appl. No.: 14/129,646

(22) PCT Filed: May 11, 2012

(86) PCT No.: PCT/JP2012/062144
§ 371 (c)(1),
(2), (4) Date: Dec. 27, 2013

(87) PCT Pub. No.: WO2013/005476
PCT Pub. Date: Jan. 10, 2013

(65) Prior Publication Data
US 2014/0131612 A1 May 15, 2014

(30) Foreign Application Priority Data

Jul. 1, 2011 (JP) ................................. 2011-147720

(51) Int. Cl.
| | |
|---|---|
| *C04B 35/622* | (2006.01) |
| *C04B 35/632* | (2006.01) |
| *C04B 35/00* | (2006.01) |
| *B28B 1/24* | (2006.01) |
| *H01F 1/01* | (2006.01) |
| *C04B 35/626* | (2006.01) |
| *C04B 35/628* | (2006.01) |
| *C04B 35/634* | (2006.01) |

(52) U.S. Cl.
CPC ............ *H01F 1/01* (2013.01); *C04B 35/62685* (2013.01); *C04B 35/62802* (2013.01); *C04B 35/632* (2013.01); *C04B 35/6342* (2013.01); *C04B 35/63408* (2013.01); *C04B 35/63424* (2013.01); *C04B 35/63432* (2013.01); *C04B 35/63436* (2013.01); *C04B 35/63468* (2013.01); *C04B 35/63488* (2013.01); *B28B 1/24* (2013.01); *C04B 2235/3274* (2013.01); *C04B 2235/5409* (2013.01); *C04B 2235/6022* (2013.01); *C04B 2235/61* (2013.01); *C04B 2235/77* (2013.01)

(58) Field of Classification Search
CPC ............. H01F 1/11; H01F 1/113; H01F 1/36; H01F 1/37; C08K 3/27; C08L 25/06; C08L 23/04; C08L 23/10; C08L 27/06; C08L 31/04; C08L 33/08; C08L 33/10; C08L 59/00; C08L 77/00
See application file for complete search history.

(56) References Cited

U.S. PATENT DOCUMENTS

| | | | |
|---|---|---|---|
| 8,765,860 B2 * | 7/2014 | Tsukamoto | ............. C04B 35/26 252/62.51 R |
| 2012/0280167 A1 * | 11/2012 | Yanagida | ............ C04B 35/2633 252/62.55 |

FOREIGN PATENT DOCUMENTS

| | | |
|---|---|---|
| JP | A-62-41759 | 2/1987 |
| JP | A-5-33006 | 2/1993 |
| JP | A-8-111335 | 4/1996 |
| WO | WO 2011/115129 | * 9/2011 |

OTHER PUBLICATIONS

International Search Report issued in International Patent Application No. PCT/JP2012/062144 dated Aug. 14, 2012 (with translation).

* cited by examiner

*Primary Examiner* — Carol M Koslow
(74) *Attorney, Agent, or Firm* — Oliff PLC (57) ABSTRACT

An injection molding composition includes a ferrite powder which is a collection of ferrite particles, a first binder and a second binder, wherein a softening point of the second binder is lower than that of the first binder, a weight and a specific surface area of the ferrite powders are represented by $Wp$ and $S$, and a weight and a density of the first binder and the second binder is represented by $Wb1$, $Wb2$, and $Db1$, $Db2$, and a hypothetical thickness $Tb1$ of the first binder is 0.6 to 3.0, and a hypothetical thickness $Tb2$ of the second binder is 5.0 to 16.0. In the composition, it is preferable that coated ferrite particles covering the outer circumference of the ferrite particles with the first binder and the second binder exist.

$$Tb1\ [\text{nm}] = (Wb1 \times 10^3)/(Db1 \times Wp \times S) \quad \text{formula (1)}$$

$$Tb2\ [\text{nm}] = (Wb2 \times 10^3)/(Db2 \times Wp \times S) \quad \text{formula (2).}$$

5 Claims, 9 Drawing Sheets

INJECTION MOLDING COMPOSITION AND PRODUCING METHOD THEREOF

FIELD OF THE INVENTION

The present invention relates to an injection molding composition and a producing method thereof. Specifically, it relates to an injection molding composition and a producing method thereof that enable to reduce fluctuations of characteristics, and moreover, to improve the characteristics.

DESCRIPTION OF THE RELATED ART

A powder injection molding method is a method of mold filling, by obtaining a mixture wherein binders are mixed in base powder of metal or metal oxide and injecting the mixture into a mold. With this injection molding method, it enables effectively to obtain an intricately-shaped molded article in a short time.

Patent Literatures 1 and 2 describe about mixing magnetic materials such as a ferrite magnetic powder and the like, plural binders, and additives by a kneader and the like, and the mixture thereby obtained is injection molded.

However, in Patent Literatures 1 and 2, a mixture is obtained by having additives such as binders and the like included at a specified percentage with respect to the weight of base powder. There was a problem that fluctuation occurred in flow characteristics of such mixture. As a result, fluctuation occurred in characteristics of strength and the like of the molded article obtained by molding the mixture. Further, characteristics of a sintered body were affected as well.

Patent Literature 1: Japanese Laid-Open Patent Publication No. S62-41759

Patent Literature 2: Japanese Laid-Open Patent Publication No. H5-33006

SUMMARY OF THE INVENTION

The present invention has been made by considering the above circumstances, and an object of the present invention is to provide an injection molding composition and a producing method thereof that enables to reduce fluctuation of characteristics, and further, to improve the characteristics.

In order to achieve the above object, an injection molding composition according to the present invention comprises a ferrite powder which is a collection of ferrite particles, a first binder and a second binder, wherein a softening point of said second binder is lower than that of said first binder, a weight and a specific surface area of said ferrite powders are represented by Wp [g] and S [m²/g], a weight and a density of said first binder are represented by Wb1 [g] and Db1 [g/cm³], and a weight and a density of said second binder are represented by Wb2 [g] and Db2 [d/cm³], and a hypothetical thickness Tb1 [nm] of said first binder is calculated by a formula (1) and a hypothetical thickness Tb2 [nm] of said second binder is calculated by a formula (2), and values obtained therefrom of said Tb1 is 0.6 to 3.0 and of said Tb2 is 5.0 to 16.0.

$$Tb1 = (Wb1 \times 10^3)/(Db1 \times Wp \times S) \quad \text{formula (1)}$$

$$Tb2 = (Wb2 \times 10^3)/(Db2 \times Wp \times S) \quad \text{formula (2)}$$

In order to improve characteristics such as flow characteristics of an injection molding composition, a strength of molded article which is obtained by molding the composition, and characteristics of a sintered body which is obtained by firing the molded article and the like, in addition to base powder, binders are combined and mixed to obtain a mixture. For the favorable flow characteristics for this mixture, it is considered to be achievable that particle surfaces of base powders are covered with binders to preserve a distance among particles so as not to contact with each other. Further, when the distance among particles is too close, it is considered that particle aggregation is generated since particles of base powders tend to contact with each other. Further, since such aggregation is not bound with binders, it causes a strength reduction of molded article. On the contrary, when the distance among particles is too far, it is considered that the density after firing decreases since the filling density of base powders in molded article decreases.

However, conventionally, the content of binders was specified as a proportion with respect to the weight of base powder. However, the necessary quantity of binder to cover the surface of powder particle changes if a specific surface area of powders differs, even if the weight of the base powder is the same. As a result, fluctuations occur in flow characteristics of composition, a strength of molded article and the like when the specific surface area of the base powder changes, even if the quantity of binder with respect to the weight of the base powder is held constant.

Further, even if the average particle size of the base powder is held constant, the specific surface area might differ depending on a particle size distribution, a shape of particle and pores of the particle surface and the like.

In view of the above, the present invention focuses on a surface area of the entire powders and a volume of binder, and it specifies a thickness (hypothetical thickness) within the above-mentioned range, hypothesizing that the surface area is covered with binders. In this way, necessary and sufficient binder is attached to the surface of the powder particles and thereby it enables to preserve a distance among particles. With that, it enables to inhibit fluctuation of flow characteristics of composition and further, to obtain excellent flow characteristics. As a result, it enables to inhibit fluctuations of characteristics (such as a strength of molded article, characteristics of sintered body and the like) and further, to improve the characteristics.

Furthermore, in order to improve various characteristics such as flow characteristics of composition, a strength of molded article and the like, it is important to combine binders having different properties.

With respect to a first binder and a second binder having a lower softening point than that of the first binder, the above hypothetical thickness is determined. With this, it enables to maximize the binder's performance, and also enables to improve the various characteristics. Further, conflicting characteristics (for example, such as hydrophilic, hydrophobic and the like) may be included in the first binder and the second binder.

Preferably, said injection molding composition comprises ferrite particles, wherein the outer circumference of said ferrite particles are coated with said first binder and said second binder.

By coating the outer circumference of the ferrite particles with binder, the binder is stably fixed to the surface of the ferrite particles. Therefore, when mixing, the surface of the ferrite particles is not exposed. As a result, flow characteristics of composition improve without contact and aggregation of the ferrite particles each other.

Especially, when the second binder exists outside of the first binder, even if the second binder is in a state of flowing, the first binder is fixed to the surface of ferrite particles and the surface of the ferrite particles is not exposed since the softening point of the second binder is lower than that of the first binder. Therefore, it enables to obtain an injection molding composition having excellent flow characteristics since the ferrite particles are equally dispersed without aggregation of the ferrite particles each other.

For the molded article obtained by molding such composition, the strength of molded article increases since the binder sufficiently exists among ferrite particles. Further, it enables easily to orient the ferrite particles by applying magnetic field since the aggregation of the ferrite particles is inhibited. Therefore, the sintered body obtained by firing such molded article has high magnetic orientation.

Preferably, the above-mentioned S is 6 to 15. By determining a specific surface area of base powders within the above range, the above effects can be further improved.

Further, a method of producing an injection molding composition according to the present invention comprises a step of obtaining a mixture by mixing a ferrite powder, a first binder and a second binder, wherein a softening point of said second binder is lower than that of said first binder, a weight and a specific surface area of said ferrite powder are represented by Wp [g] and S [m²/g], a weight and a density of said first binder are represented by Wb1 [g] and Db1 [g/cm³], and a weight and a density of said second binder are represented by Wb2 [g] and Db2 [g/cm³], and a hypothetical thickness Tb1 [nm] of said first binder is calculated by a formula (1) and a hypothetical thickness Tb2 [nm] of said second binder is calculated by a formula (2), and values obtained therefrom of said Tb1 is 0.6 to 3.0 and of said Tb2 is 5.0 to 16.0.

$$Tb1=(Wb1\times10^3)/(Db1\times Wp\times S) \quad \text{formula (1)}$$

$$Tb2=(Wb2\times10^3)/(Db2\times Wp\times S) \quad \text{formula (2)}$$

Based on the above formulas (1) and (2), by determining the content of the first binder and the second binder and mixing them with base powders, necessary and sufficient binder is attached to the surface of powder particles and thereby it enables to appropriately preserve a distance among particles. With this, it enables to inhibit fluctuation of flow characteristics of composition, and also enables to obtain excellent flow characteristics. As a result, it enables to inhibit fluctuations of characteristics (such as a strength of molded article, characteristics of sintered body and the like) and further, it enables to improve the characteristics.

DESCRIPTION OF THE PREFERRED EMBODIMENTS

The following is the explanation of the present invention based on embodiments shown in Figures.

Injection Molding Composition

An injection molding composition according to the present embodiment comprises a ferrite powder which is a collection of ferrite particles, a first binder and a second binder. In the present embodiment, it is preferable that the ferrite particles are coated with the first binder and the second binder.

Coated Ferrite Particle

Figure 1A:
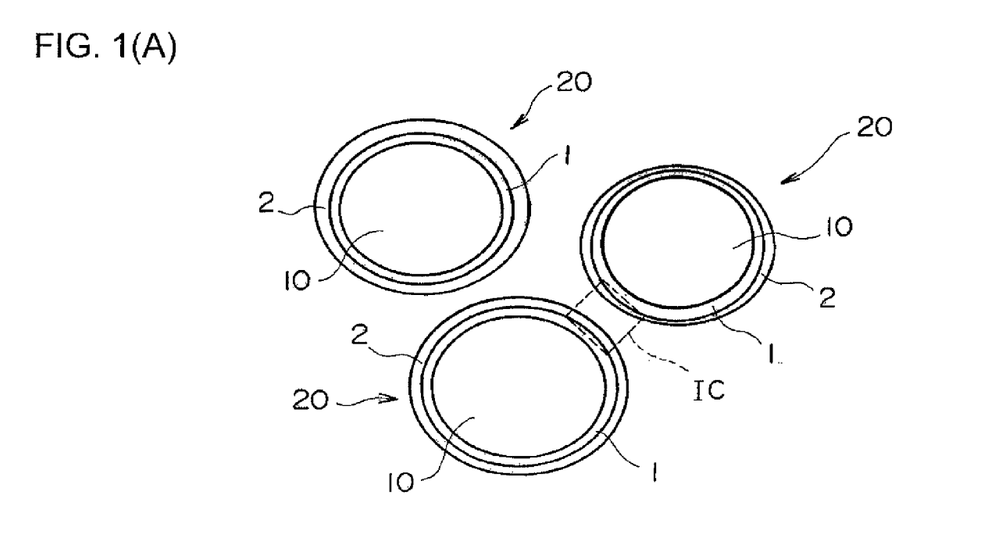
FIG. 1(A) is a schematic cross-sectional view of coated ferrite particles in an injection molding composition according to one embodiment of the present invention.

As a coated ferrite particle, it may have a configuration that the surface of ferrite particle is covered with a second binder, and the second binder is covered with a first binder. However, in the present embodiment, as shown in FIG. 1(A), it exemplifies a configuration that the first binder covers the outer circumference of ferrite particles and the second binder covers the outer circumference of the first binder.

If a specific surface area of the ferrite powder is represented by S [m²/g] and a weight of the ferrite powder is represented by Wp [g], the surface area of the entire ferrite powders is obtained by the following formula, Wp×S [m²]. This value may be deemed to be a total of the surface area of the whole ferrite particles included in ferrite powders. In the present embodiment, it is hypothesized that the first binder and the second binder are formed in thickness of Tb1 [nm] and Tb2 [nm] with respect to the surface area (Wp×S).

Figure 1B:
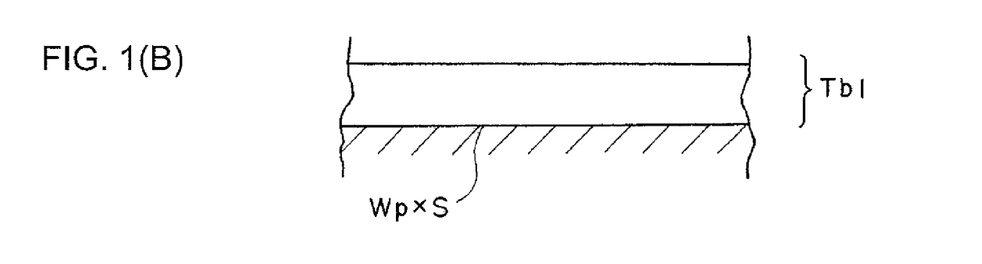
FIG. 1(B) is a schematic cross-sectional view explaining a hypothetical thickness Tb1.

As shown in FIG. 1(B), the first binder is formed in thickness of Tb1 with respect to the surface area (Wp×S). Therefore, the volume Vb1 [m³] of the first binder is obtained by the following formula, Wp×S×Tb1×10⁻⁹.

On the other hand, the volume Vb1 of the first binder is obtained by dividing the weight Wb1 [g] of the first binder by the density Db1 [g/cm³].

Therefore, the formula Wp×S×Tb1×10⁻⁹=(Wb1/Db1× 10⁶) is established. With this, the thickness Tb1 can be obtained by the formula (1) that is Tb1=Wb1×10³/(Db1× Wp×S). In the same way, the thickness Tb2 of the second binder can be obtained by the formula (2) that is Tb2=Wb2× 10³/(Db2×Wp×S).

In this way, in the present embodiment, the hypothetical thickness, when the specific surface area of the entire powders is uniformly coated with binders, is represented by Tb1 and Tb2.

In the present embodiment, Tb1 is 0.6 to 3.0 nm, preferably 0.7 to 2.5 nm, and more preferably 0.8 to 2.0 nm. Further, Tb2 is 5.0 to 16.0 nm, preferably 7.0 to 14.0 nm, and more preferably 8.0 to 12.0 nm.

By determining the hypothetical thickness of Tb1 and Tb2 within the above range, it enables to inhibit fluctuations of characteristics such as flow characteristics since the distance among ferrite particles is appropriately preserved.

Ferrite Powder

A composition of ferrite powder is not particularly limited, and it should be determined in accordance with the desired characteristics. Further, in the present embodiment, a specific surface area S [$m^2/g$] of the ferrite powder is preferably 6 to 15.

Although the measuring method of the specific surface area is not particularly limited, it is preferable to calculate the specific surface area by BET method.

First Binder

A first binder is not particularly limited as long as it has a higher softening point than that of a second binder which will be described later. In the present embodiment, the first binder is preferably hydrophilic.

By coating the surface of ferrite particles with the first binder, the first binder intervenes among ferrite particles. As a result, it enables to prevent an aggregation of ferrite particles without contacting ferrite particles each other. With this, flow characteristics of composition improve and characteristics of injection molding improve as well. Further, a density and a strength of molded article increases since ferrite particles are uniformly dispersed. Furthermore, it enables to improve orientation of particles since the ferrite particles are not aggregated.

A softening point of the first binder is preferably 150 to 250° C.

In the present embodiment, the softening point is a temperature that a binder gets soft and it becomes easily movable among particles. Further, although the concept of the softening point is almost the same with that of the melting point of binders, it may be the same with the glass transition point.

In the present embodiment, as a specific first binder, high polymer materials such as polyvinyl acetate, polyvinyl chloride, nylon 6, acryl resin and the like are exemplified.

Second Binder

A second binder is not particularly limited if it has a lower softening point than that of the first binder. The second binder is preferably hydrophobic. If materials (such as wax and the like) other than the first binder and the second binder are added to compositions, the materials generally exist outside of the second binder. As a result, if the second binder is hydrophilic, a mixing condition with the above materials tends to get worse.

A softening point of the second binder is preferably 70 to 200° C.

In the present embodiment, as a specific second binder, high polymer materials such as high density polyethylene, polypropylene, polyacetal, polystyrene and the like are exemplified.

Further, in the actual injection molding composition, different from a coated ferrite particle in FIG. 1(A), a boundary between the first binder and the second binder does not always reveal its presence in a state that is clearly recognized, and also it is considered that the thickness does not always stay constant. Further, all of ferrite particles in the injection molding composition do not have to be coated with the first binder and the second binder. Ferrite particles coated only with the first binder and ferrite particles coated only with the second binder may exist.

In the present embodiment, binders having a particular characteristic are divided into two categories, a first binder and a second binder, and a hypothetical thickness of each binder is determined. With this, it enables to maximize the performance of binders. Therefore, by keeping the content of binders to a minimum, it enables to reduce the content of binder and that results in improvement of dimensional accuracy.

Further, in the present embodiment, a desired binder should be preferentially applied on the particle surface in consideration of a reactivity of the particle surface with the binders.

For example, if a first binder is hydrophilic, a hydrophilic material is more likely to absorb moisture. Therefore, if a second binder does not exist or a second binder is hydrophilic, flow characteristics of composition might result in change with time. With that, by covering a hydrophilic first binder with a hydrophobic second binder, the first binder can be protected from the outside moisture. As a result, it enables to improve flow characteristics of composition as a whole.

In the present embodiment, it is preferable that an injection molding composition additionally comprises a wax.

Figure 1C:
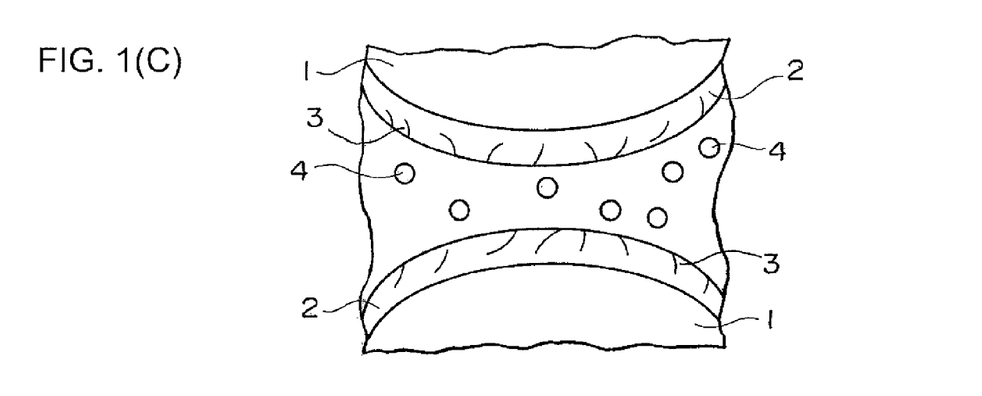
FIG. 1(C) is an enlarged view of IC portion in FIG. 1(A).

In the present embodiment, as shown in FIG. 1(C), the wax exists permeating the surface of the second binder. Therefore, flow characteristics of composition can be improved and further, release characteristics when molding can be improved as well. As a specific wax, synthetic waxes such as paraffin wax, urethanated wax, polyethylene glycol and the like are used, in addition to natural waxes such as carnauba wax, montan wax, beeswax and the like.

In the present embodiment, the injection molding composition may comprise other components in accordance with the desired characteristics. For example, it may comprise a plasticizer.

As shown in FIG. 1(C), the plasticizer exists among binder molecules covering ferrite particles. With this, it enables to preserve a distance among ferrite particles and also enables to further improve the above-mentioned effects.

As a specific plasticizer, for example, phthalate ester is used, and diisodecyl phthalate, dilauryl phthalate, butyl lauryl phthalate, di-n-octyl phthalate, his phthalate (2-ethylhexyl) (DOP) and the like are preferable.

Producing Method of Injection Molding Composition

First, a ferrite powder as a base powder, a first binder and a second binder are prepared. In the present embodiment, it is preferable to prepare a wax, and a plasticizer may be prepared as necessary.

As the ferrite powder, oxide may be used, and also compounds that can be changed to oxides by firing may be used. The ferrite powder may be calcined as necessary.

In the present embodiment, an injection molding composition is produced by using a kneader. First, a first binder and a second binder are weighed so that the thickness of Tb1 and Tb2 is within the above-mentioned range, in view of the weight (Wp) and the specific surface area (S) of the ferrite powder. Next, the weighed ferrite powders, the first binder and the second binder are put into the kneader to mix. The conditions such as rotation frequency, mixing time, mixing temperature and the like should be appropriately determined. Further, the order of putting binders may be changed.

In the present embodiment, it is preferable to add a wax after mixing the ferrite powders, the first binder and the second binder. The content of wax should be determined so that it satisfies the above-mentioned range. Further, the conditions such as rotation frequency, mixing time, mixing temperature and the like should be appropriately determined.

By going through the above step, the injection molding composition wherein ferrite particles coated with the first binder and the second binder exists can be obtained. Further, flow characteristics of the composition can be improved further by the wax, and release characteristics when molding can be sufficiently ensured. For the obtained injection molding composition, it is preferable to make it into pellets by using a pelletizer and the like.

The above-mentioned pellets are put in the injection molding apparatus to form. In the present embodiment, CIM (ceramic injection molding) is performed by applying magnetic field to a mold apparatus.

The pellets put in the injection molding apparatus are heated at 160 to 230° C., melted and mixed to turn into a material for molding. And then, the material is injected into a cavity of the mold apparatus by a screw to obtain a molded article. The temperature of the mold apparatus is 20 to 80° C. The magnetic field applied to the mold apparatus may be appropriately determined.

After that, a delipidation is performed to the obtained molded article. The conditions for the delipidation is not particularly limited, and it should be performed under the conditions know in the art.

The molded article after the delipidation are fired to obtain a sintered body. The conditions for firing is not particularly limited, and it should be performed under the conditions known in the art. For example, the firing temperature is preferably about 1200° C.

The sintered body obtained through the above steps is processed as necessary and turns into a ferrite magnet, for example.

Further, the present invention is not limited to the above embodiments, and various changes may be made without departing from the scope of the invention.

EXAMPLES

The following is the explanation of the present invention based on more detailed examples. However, the present invention is not limited to these examples.

Example 1

As a base powder, a ferrite powder 1 having a BET specific surface area (S) of 5.5 m$^2$/g and a ferrite powder 2 having a BET specific surface area (S) of 9.1 m$^2$/g were prepared. Further, the followings were prepared; acryl resin as a first binder, polyethylene as a second binder, paraffin wax as a wax, and dioctyl phthalate (DOP) as a plasticizer.

Sample 1

First, a composition including 0.65 wt % of first binder, 4.95 wt % of second binder, 1.47 wt % of wax and 0.16 wt % of plasticizer with respect to a ferrite powder 1 were put into the kneader and mixed. They were mixed under the condition of 16 rpm rotation frequency, 2 hours mixing time, and mixing temperature 195° C. to obtain an injection molding composition. For the obtained injection molding composition, flow characteristics (MVR) were measured with the condition of temperature 200° C. and load 10 kg, and further this composition was formed into pellets by using a pelletizer. The result is shown in Table 1.

Next, the pellets were put into an injection molding apparatus and then they were heated, melted, and mixed to injection mold of the mold apparatus to which the magnetic field was applied. The thickness of the molded article after the step of magnetic field injection molding is 2 mm and an arc flat plate was formed.

The strength of the obtained molded article was evaluated by measuring a breaking load as shown below.

The breaking load was calculated by the load when the molded article broke, as a result of supporting both ends of the molded article, and gradually increasing a concentrated load in the middle of the molded article from the value ON. The breaking load calculated as above was recognized as a strength of molded articles. The result is shown in Table 1.

Next, the molded article was delipidated. After that, the temperature was turned up to 1200° C. and kept the molded article with this temperature for one hour to obtain a sintered body of ferrite magnet (firing step).

For the obtained sintered body of ferrite magnet, a sintered body density and a magnetic orientation were evaluated. The result is shown in Table 1.

Sample 2

Further, for a ferrite powder 2, a sintered body of ferrite magnet was obtained in the same way with the ferrite powder 1, by producing an injection molding composition with applying the same blending quantity and the same condition with the ferrite powder 1, and by using the composition thereby obtained. For flow characteristics, a strength of the molded article, a sintered body density and magnetic orientation, they were evaluated in the same way with the ferrite powder 1. The result is shown in Table 1.

Sample 3 and 4

Next, the blending quantity was determined so that Tb1 was 1.2 nm and Tb2 was 11.0 nm with respect to the ferrite powder 1 (sample 3) and the ferrite powder 2 (sample 4). A sintered body of ferrite magnet was produced as above and the characteristics were evaluated. The result is shown in Table 1.

TABLE 1

| Samples | ferrite powder specific surface area (m$^2$/g) | composition flow characteristics (cc/10 min) | molded article strength of molded article (N) | sintered body magnetic orientation (%) | ferrite powder density of sintered body (g/cm$^3$) |
|---|---|---|---|---|---|
| sample 1 | 5.5 | 328.1 | 58.3 | 99.4 | 5.058 |
| sample 2 | 9.1 | 1.2 | 2.6 | 98.5 | 5.080 |
| sample 3 | 5.5 | 458.3 | 80.1 | 99.5 | 5.056 |
| sample 4 | 9.1 | 435.7 | 85.4 | 99.6 | 5.054 |

From Table 1, it could be confirmed that fluctuation of characteristics got large, when simply compounding in accordance with a weight percent (samples 1 and 2), without taking a specific surface area into account, with respect to powders (ferrite powder 1, ferrite powder 2) having different specific surface areas.

On the other hand, it could be confirmed that fluctuation of characteristics got small, when compounding so that Tb1 and Tb2 stayed constant (sample 3 and 4) in accordance with a specific surface area of ferrite powder.

Example 2

As a base powder, 1000 g (Wp) of ferrite powders having a BET specific surface area (S) of 10.3 m²/g were prepared. Further, the followings were prepared; acryl resin as a first binder, polyethylene as a second binder, paraffin wax as a wax, and dioctyl phthalate (DOP) as a plasticizer.

Further, a density Db1 of the first binder was 1.19 g/cm³ and a density Db2 of the second binder was 0.9 g/cm³.

In accordance with the weight (Wp) and the specific surface area (S) of the above ferrite powder and the density (Db1 and Db2) of the first binder and the second binder, the weights of the first binder and the second binder were determined so that Tb1 was 0.4 to 5.0 nm and Tb2 was 6 to 18 nm.

Figure 2:
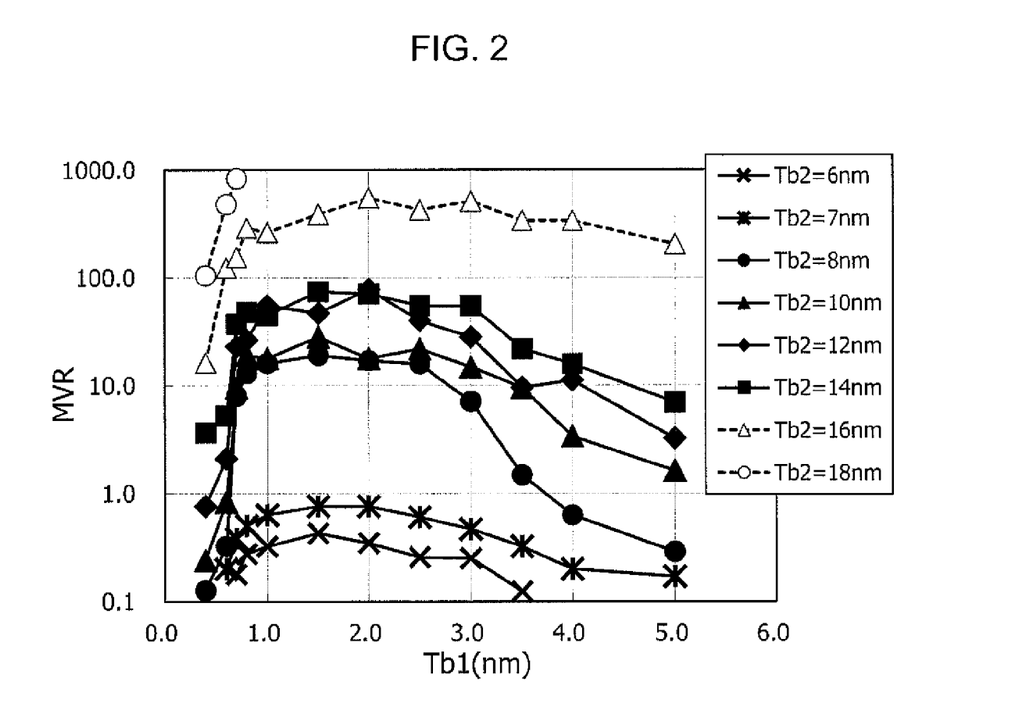
FIG. 2 is a graph showing the relation between Tb1 and flow characteristics of injection molding composition in regard to samples according to examples and comparative examples of the present invention.

The ferrite powders having a weight of Wp (g), the weight of the first binder and the second binder as determined above, 30 g of wax, 0.01 mole of DOP were put in a kneader and mixed under the condition of 16 rpm rotation frequency, 2 hours mixing time, mixing temperature 195° C. to obtain an injection molding composition. For the obtained injection molding composition, flow characteristics (MVR) were measured with the same condition with Example 1 and further, this composition was formed into pellets by using a pelletizer. The measurement result of the flow characteristics is shown in FIG. 2. FIG. 2 shows a graph indicating a transition along with the change of Tb2, with a horizontal axis representing as Tb1 and a vertical axis representing as flow characteristics.

Figure 3:
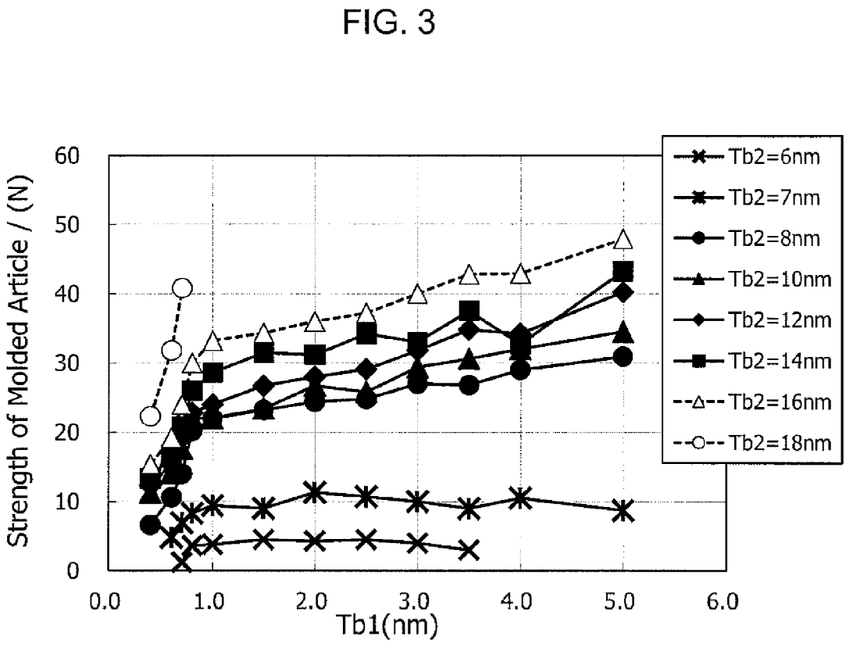
FIG. 3 is a graph showing the relation between Tb1 and a strength of molded article in regard to samples according to examples and comparative examples of the present invention.
Figure 4:
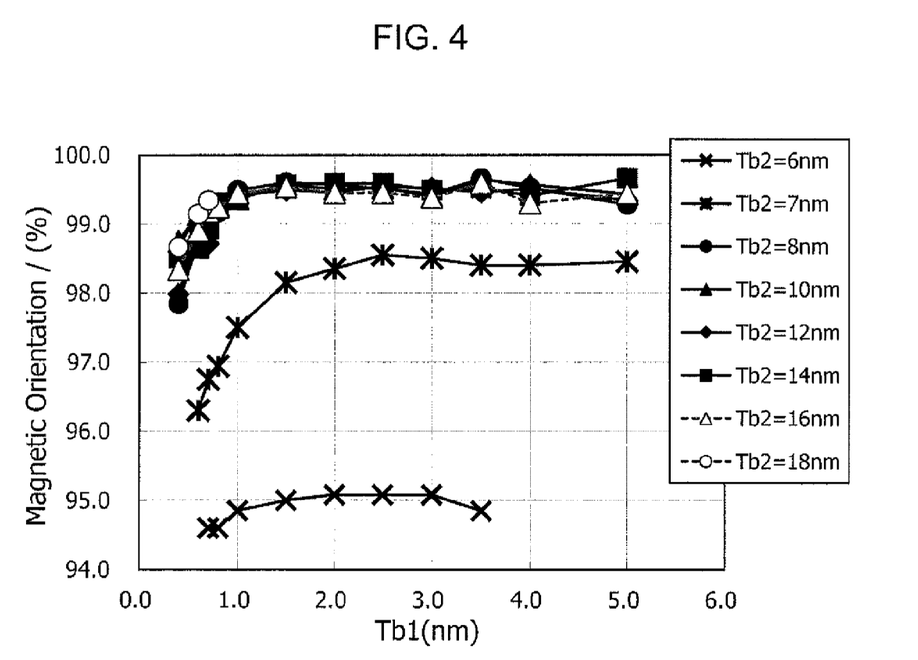
FIG. 4 is a graph showing the relation between Tb1 and magnetic orientation of sintered body in regard to samples according to examples and comparative examples of the present invention.
Figure 5:
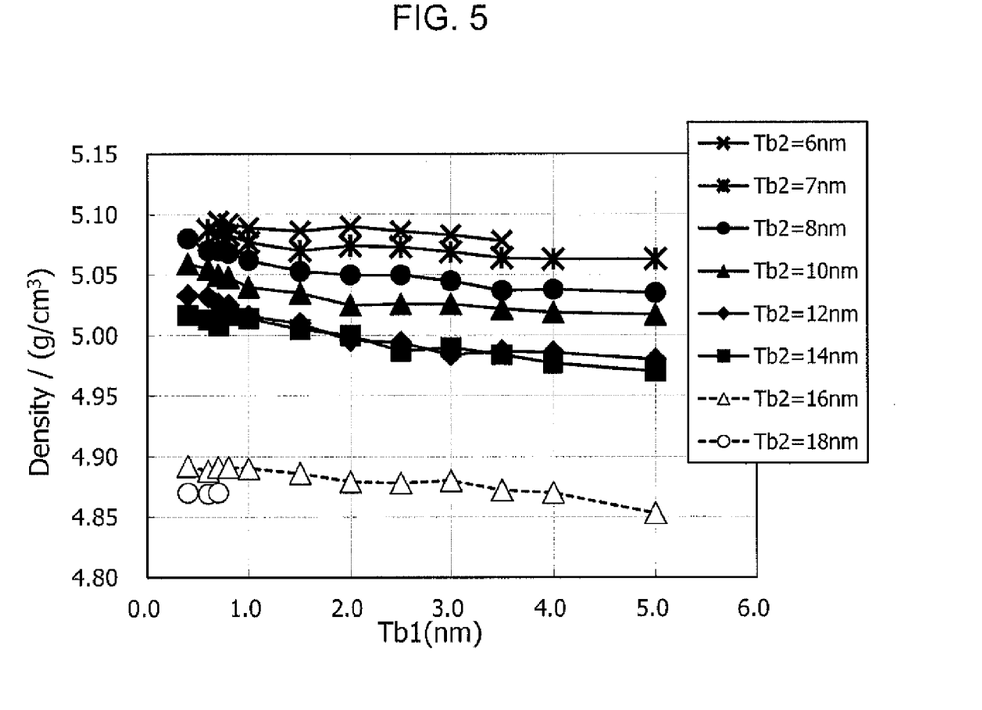
FIG. 5 is a graph showing the relation between Tb1 and a density of sintered body in regard to samples according to examples and comparative examples of the present invention.
Figure 6:
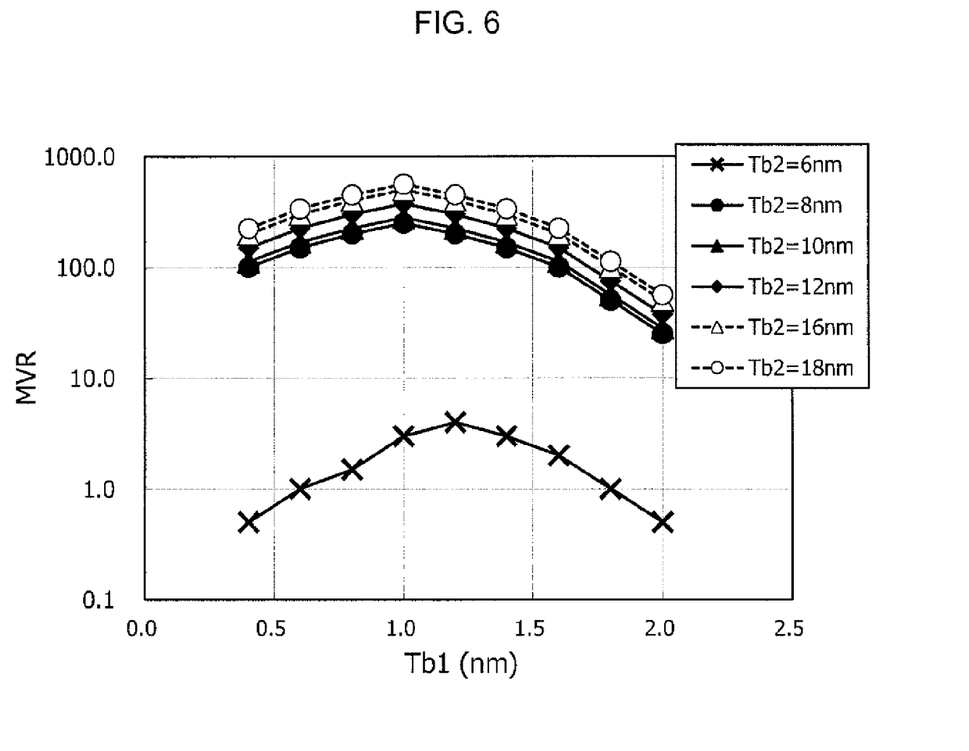
FIG. 6 is a graph showing the relation between Tb1 and flow characteristics of injection molding composition in regard to samples according to examples and comparative examples of the present invention.
Figure 7:
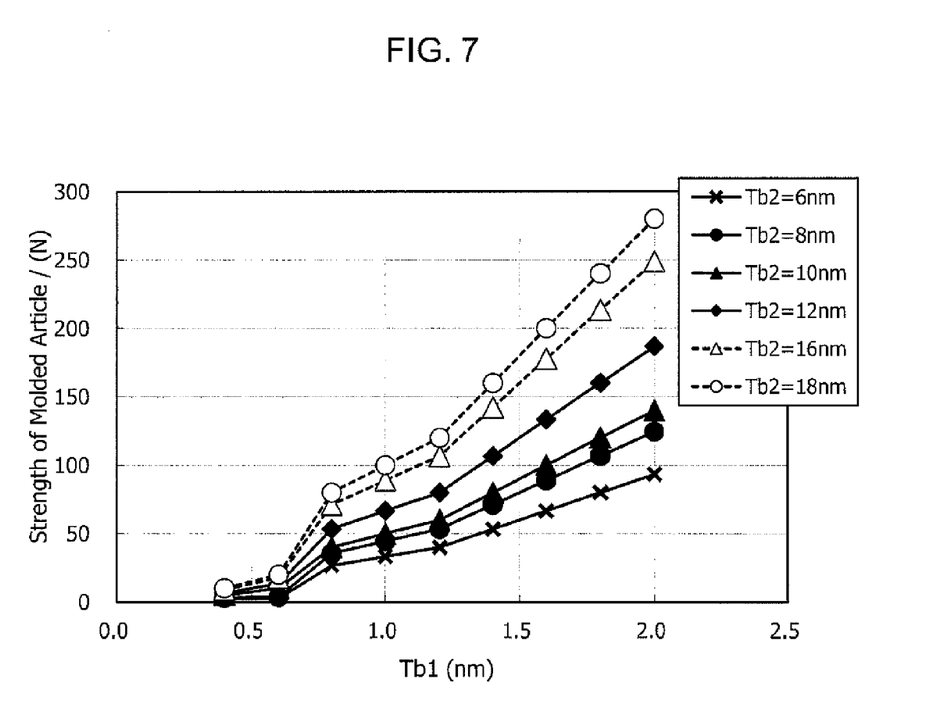
FIG. 7 is a graph showing the relation between Tb1 and a strength of molded article in regard to samples according to examples and comparative examples of the present invention.
Figure 8:
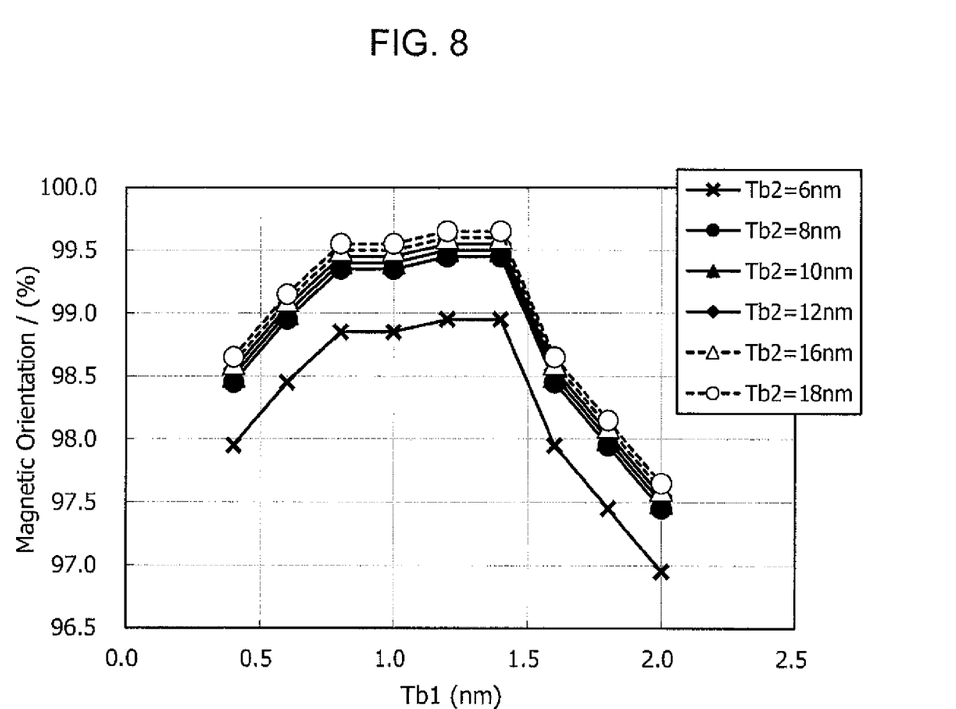
FIG. 8 is a graph showing the relation between Tb1 and magnetic orientation of sintered body in regard to samples according to examples and comparative examples of the present invention.
Figure 9:
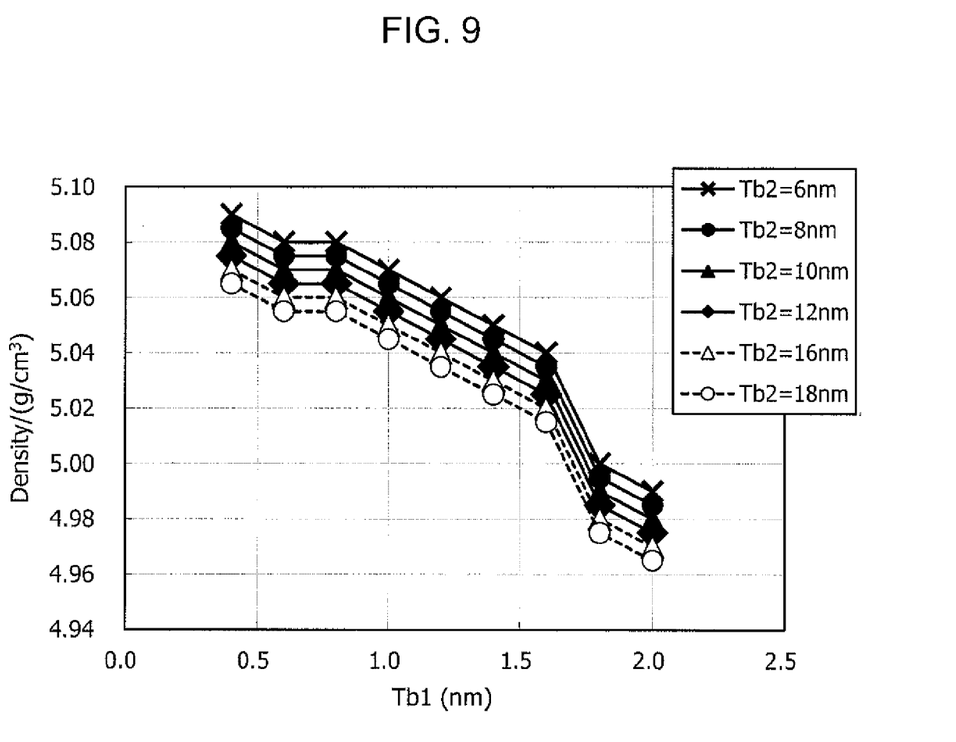
FIG. 9 is a graph showing the relation between Tb1 and a density of sintered body in regard to samples according to examples and comparative examples of the present invention.

Next, the obtained injection molding composition was molded and fired in the same way with Example 1 to obtain a sintered body. For the molded article and the sintered body, they were evaluated as with Example 1. The result is shown in FIGS. 3 to 5. FIG. 3 shows a graph indicating a transition along with the change of Tb2, with a horizontal axis representing as Tb1 and a vertical axis representing as a strength of the molded article. FIG. 4 shows a graph indicating a transition along with the change of Tb2, with a horizontal axis representing as Tb1 and a vertical axis representing as magnetic orientation. FIG. 5 shows a graph indicating a transition along with the change of Tb2, with a horizontal axis representing as Tb1 and a vertical axis representing as a sintered body density.

From FIGS. 2 to 5, it could be confirmed that it enables to inhibit fluctuation of characteristics, and further, to obtain better characteristics (flow characteristics, strength of molded article, magnetic orientation of sintered body, density and the like) by determining Tb1 and Tb2 within the above-mentioned range.

Example 3

As a base powder, 1000 g (Wp) ferrite powders having a BET specific surface area (S) of 9.0 m²/g were prepared. Further, the followings were prepared; acryl resin as a first binder, polyethylene as a second binder, carnauba wax as a wax and butyl lauryl phthalate as a plasticizer.

Further, a density Db1 of the first binder was 1.19 g/cm³ and a density Db2 of the second binder was 0.9 g/cm³.

In accordance with the weight (Wp) and the specific surface area (S) of the above ferrite powder and the density (Db1 and Db2) of the first binder and the second binder, the weights of the first binder and the second binder was determined so that Tb1 was 0.40 to 2.0 nm and Tb2 was 6 to 18 nm.

The weight of the first binder and the second binder as determined above, and wax and plasticizer were added to the ferrite powder in the same way with Example 2 to produce an injection molding composition. Further, a ferrite magnet was produced and then evaluated as with Example 1. The result is shown in FIGS. 6 to 9.

From FIGS. 6 to 9, it could be confirmed that a similar result can be achieved with Example 2.

In the present examples, as materials for magnets, a hard ferrite was exemplified. However, even when a soft ferrite is used, it enables to achieve the similar effects with the above-mentioned including the improvement of the magnetic orientation.

DESCRIPTION OF NUMERALS

20 - - - coated ferrite particle
10 - - - ferrite particle
1 - - - first binder
2 - - - second binder
3 - - - wax
4 - - - plasticizer

The invention claimed is:

1. An injection molding composition comprising a ferrite powder which is a collection of ferrite particles, a first binder and a second binder, wherein
    a softening point of said second binder is lower than that of said first binder,
    a weight and a specific surface area of said ferrite powders are represented by Wp [g] and S [m²/g], a weight and a density of said first binder are represented by Wb1 [g] and Db1 [g/cm³], and a weight and a density of said second binder are represented by Wb2 [g] and Db2 [g/cm³], and
    a hypothetical thickness Tb1 [nm] of said first binder is calculated by a formula (1) and a hypothetical thickness Tb2 [nm] of said second binder is calculated by a formula (2), and values obtained therefrom of said Tb1 is 0.6 to 3.0 and of said Tb2 is 5.0 to 16.0

$$Tb1=(Wb1\times 10^3)/(Db1\times Wp\times S) \quad \text{formula (1)}$$

$$Tb2=(Wb2\times 10^3)/(Db2\times Wp\times S) \quad \text{formula (2).}$$

2. The injection molding compositions as set forth in claim 1, wherein
    coated ferrite particles covering the outer circumference of said ferrite particles with said first binder and said second binder exist in said injection molding compositions.

3. The injection molding compositions as set forth in claim 1, wherein
    said S is 6 to 15.

4. A method of producing the injection molding composition, comprising
    a step of obtaining a mixture by mixing a ferrite powder, a first binder and a second binder, wherein
    a softening point of said second binder is lower than that of said first binder,
    a weight and a specific surface area of said ferrite powders are represented by Wp [g] and S [m²/g], a weight and a density of said first binder are represented by Wb1 [g]

and Db1 [g/cm³], and a weight and a density of said second binder are represented by Wb2 [g] and Db2 [g/cm³], and a hypothetical thickness Tb1 [nm] of said first binder is calculated by a formula (1) and a hypothetical thickness Tb2 [nm] of said second binder is calculated by a formula (2), and values obtained therefrom of said Tb1 is 0.6 to 3.0 and of said Tb2 is 5.0 to 16.0

$$Tb1 = (Wb1 \times 10^3)/(Db1 \times Wp \times S) \quad \text{formula (1)}$$

$$Tb2 = (Wb2 \times 10^3)/(Db2 \times Wp \times S) \quad \text{formula (2)}.$$

5. The injection molding compositions as set forth in claim 2, wherein said S is 6 to 15.

* * * * *